(12) United States Patent
Abe

(10) Patent No.: US 7,084,999 B2
(45) Date of Patent: Aug. 1, 2006

(54) PRINT SYSTEM, INFORMATION PROCESSING APPARATUS AND METHOD, AND COMPUTER-READABLE MEMORY MEDIUM

(75) Inventor: Koichi Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 10/013,862

(22) Filed: Dec. 13, 2001

(65) Prior Publication Data

US 2002/0080401 A1 Jun. 27, 2002

(30) Foreign Application Priority Data

Dec. 22, 2000 (JP) ............................. 2000-391203

(51) Int. Cl.
*G06F 15/00* (2006.01)
*G06F 17/60* (2006.01)
*G06G 15/01* (2006.01)

(52) U.S. Cl. .................... 358/1.15; 358/1.15; 399/223; 705/1

(58) Field of Classification Search ............... 358/1.15, 358/1.16, 442, 444, 1.14, 468; 347/15, 102, 347/34; 709/223, 229; 399/223, 270, 8; 379/237; 101/183; 370/200, 235; 705/37, 705/1, 22, 7

See application file for complete search history.

(56) References Cited

U.S. PATENT DOCUMENTS 5,528,734 A 6/1996 Sanchez .................... 395/115
5,764,869 A * 6/1998 Bagley et al. ............. 358/1.16
5,894,545 A * 4/1999 Fukuta ....................... 358/1.16
6,281,989 B1 * 8/2001 Tomida ....................... 358/442
6,293,714 B1 * 9/2001 Noda ........................... 400/61
2002/0021454 A1 * 2/2002 Johnson et al. ............ 358/1.14

FOREIGN PATENT DOCUMENTS

| JP | 5-108281 | 4/1993 |
| JP | 7-325678 | 12/1995 |
| JP | 2000-168198 | 6/2000 |

* cited by examiner

*Primary Examiner*—Kimberly Williams
*Assistant Examiner*—Saeid Ebrahimi-DehKordy

(57) ABSTRACT

Even in case of using a hand-held personal computer, operability regarding a printing operation is improved and a print can be normally completed without allowing the print to be finished as an error. When a sufficient available area exists in an RAM 11 of a hand-held personal computer 1, image data sent from an application is converted into print data and, thereafter, the print data is temporarily stored as a spool file into the RAM 11. At the point when the whole print data is stored and the spool file is completed, a printing process in the application is released and the print data in the spool file is sent to a printer 5 by a background. If the sufficient available area does not exist in the RAM 11 of the hand-held PC 1, the whole print data is not temporarily stored as a spool file but the raster unit image data sent from the application is converted into the print data. The print data is sequentially sent to the printer 5 by the foreground and the printing process is executed.

14 Claims, 7 Drawing Sheets

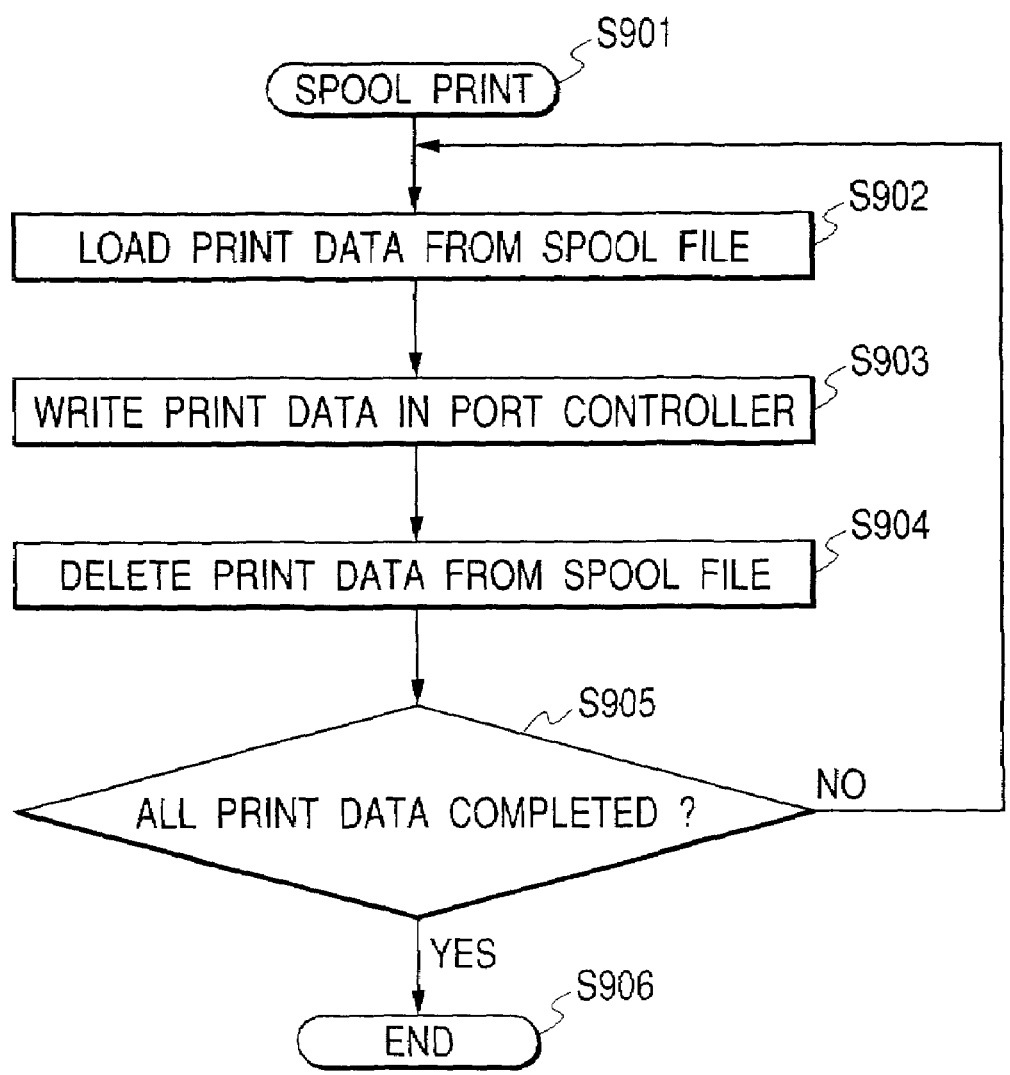

PRINT SYSTEM, INFORMATION PROCESSING APPARATUS AND METHOD, AND COMPUTER-READABLE MEMORY MEDIUM

BACKGROUND OF THE INVENTION

1. Field of the Invention

The invention relates to a print system and information processing apparatus and method for transmitting print data to a recording apparatus, thereby allowing the recording apparatus to print. The invention also relates to a computer-readable memory medium.

2. Related Background Art

Hitherto, a print system such that a personal computer (hereinafter, also abbreviated to "PC") is used as a host and peripheral equipment such as a recording apparatus (printer) which can print or the like is connected to the PC, thereby enabling the recording apparatus to print by various application software exists.

In such a system, when a printing process is executed by the application software, print data is generated as a temporary file and, after the file is completed, the print data in the file is transmitted from the PC to the recording apparatus, thereby enabling the recording apparatus to print. In such a case, at the point when the generation of the temporary file is completed, the printing process can be released from the application software, and after that, an arbitrary operation can be executed in the application software.

The temporary file usually has a size corresponding to data in a range from tens of MB to 100 MB, although it depends on a print target. Generally, the personal computer has a hard disk drive (hereinafter, also referred to as "HDD") which can store data of a few GB as a storage device of a large memory capacity, and the temporary file is formed in the hard disk drive. In most of the cases, therefore, a situation that the temporary file cannot be formed due to a factor such as a shortage of an available area of the hard disk drive does not occur. As examples of such a system, the systems disclosed in JP-A-5-108281, JP-A-7-325678, and JP-A-2000-168198, and the like can be mentioned.

On the other hand, in recent years, as a simplified personal computer, a small portable personal computer (hereinafter, also referred to as a hand-held personal computer or a hand-held PC) which does not have a storage device of a large memory capacity such as an HDD or the like but has only a memory (RAM) which can usually store data of a capacity of tens of MB as memory means has been developed.

In such a hand-held PC, when the user intends to connect the recording apparatus as peripheral equipment and use it, if he uses a method of forming a temporary file similar to that of the PC, the file is formed in the memory (RAM). Thus, a case where the temporary file cannot be formed due to a factor such as a shortage of the available area in the memory (RAM) often occurs.

Therefore, in a print system using such a hand-held PC, usually, the temporary file is not formed, but by sequentially transmitting a part of print data which is sent from the application software to the recording apparatus, the printing process is executed.

However, in case of the print system using the hand-held PC, usually, since the temporary file is not formed, but by sequentially transmitting a part of print data which is sent from the application software to the recording apparatus, the printing process is executed, until all of the print data is transmitted from the hand-held PC to the recording apparatus, the printing process cannot be released from the application software. Thus, it takes a very long time to release the printing process and a problem such that the application software cannot be operated for such a period of time occurs.

Even if the print is tried by the method of forming the temporary file, a case where an available area in the memory (RAM) is lacking at a stage of forming the file and the file cannot be completed often occurs. In such a case, although the file is formed halfway, the process is finished as an error at the point when the file can no longer be formed. A problem such that even though the user waits for the print for such a period of time, the print data is not printed at all but the process is finished as an error occurs.

SUMMARY OF THE INVENTION

The invention is made in consideration of the above problems and it is an object of the invention to improve operability regarding the printing operation even in case of using a hand-held personal computer and to enable the print to be normally completed in all cases without allowing the print to be finished as an error.

According to the invention, there is provided an information processing apparatus for transmitting print data which controls a recording apparatus and enables the recording apparatus to print to the recording apparatus, wherein a size of available area in memory means is confirmed, the size of the available area is compared with a size of the whole print data which is transmitted to the recording apparatus, and when the size of the whole print data is larger, a part of the whole print data is generated by using the available area in the memory means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a flowchart showing processes for a spool print.

DETAILED DESCRIPTION OF THE PREFERRED EMBODIMENTS

An embodiment of a print system, information processing apparatus and method, and a computer-readable memory medium of the invention will be described in detail hereinbelow with reference to the drawings. In the following description, USB is an abbreviation of "Universal Serial Bus" and is a well-known interface by which bidirectional communication is possible. Its detailed description is omitted here.

Figure 1:
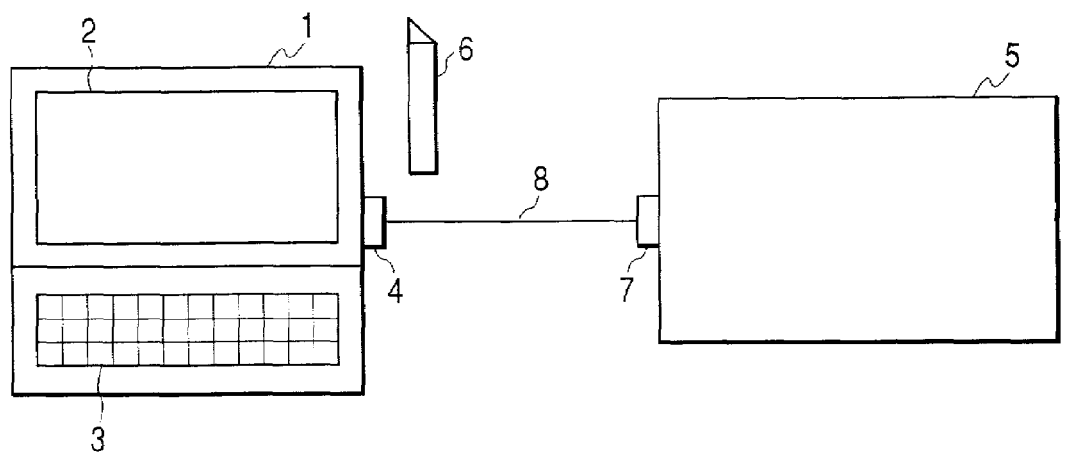
FIG. 1 is a diagram showing a construction of a print system of the embodiment.

FIG. 1 is a diagram showing a construction of a print system of the embodiment. In the diagram, reference numeral 1 denotes a hand-held personal computer (or hand-held PC) and the installed OS is Microsoft Windows CE. Reference numeral 2 denotes a liquid crystal display (LCD); 3 a keyboard; and 4 a USB port (host). The LCD 2 is constructed in a form of a touch panel. By performing the operation such as drag, drop, tap, or the like by using a stylus pen 6, functions similar to those of a mouse which is used for a personal computer are realized. The PC 1 corresponds to the information processing apparatus in the invention.

Reference numeral 5 denotes a color printer of an ink-jet system and 7 indicates a USB port (client). The color printer 5 corresponds to the recording apparatus in the invention.

The hand-held PC 1 and printer 5 are connected via a USB cable 8 and bidirectional communication of data can be made between the PC 1 and printer 5.

Figure 2:
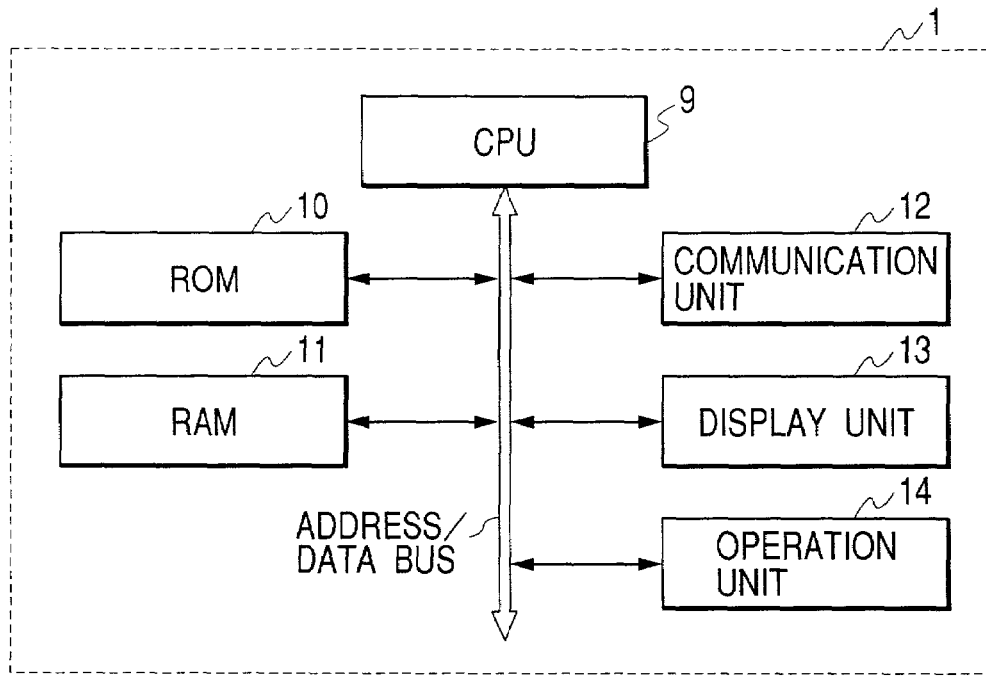
FIG. 2 is a block diagram showing a construction of hardware in a hand-held personal computer 1.

FIG. 2 is a block diagram showing a construction of hardware in the hand-held PC 1. The hand-held PC 1 is a portable terminal which is used as a simplified PC and has a main feature such that it does not have a storage device of a large memory capacity such as a hard disk drive (ordinarily, a device which can store data of a few GB) and only an RAM is used as memory means.

In the diagram, reference numeral 9 denotes a CPU comprising a microprocessor or the like. The CPU functions as a central processing unit of the hand-held PC 1 and controls an RAM 11, a communication unit 12, a display unit 13, and an operation unit 14 in accordance with a program stored in an ROM 10.

The OS, each device driver for controlling a display and a port, each application which can be activated on the hand-held PC 1, and the like have been stored in the ROM 10. The RAM 11 usually has a memory capacity of about 32 MB, the half of the capacity is allocated as a memory area for executing the program, and the remaining half is allocated as a memory area for storing the data.

The communication unit 12 includes the USB port 4 and controls the communication of the USB. The display unit 13 includes the LCD 2 and controls a display or the like of a user interface (hereinafter, also abbreviated as "UI") such as an application or the like. The operation unit 14 includes the keyboard 3 and controls a key input.

Figure 3:
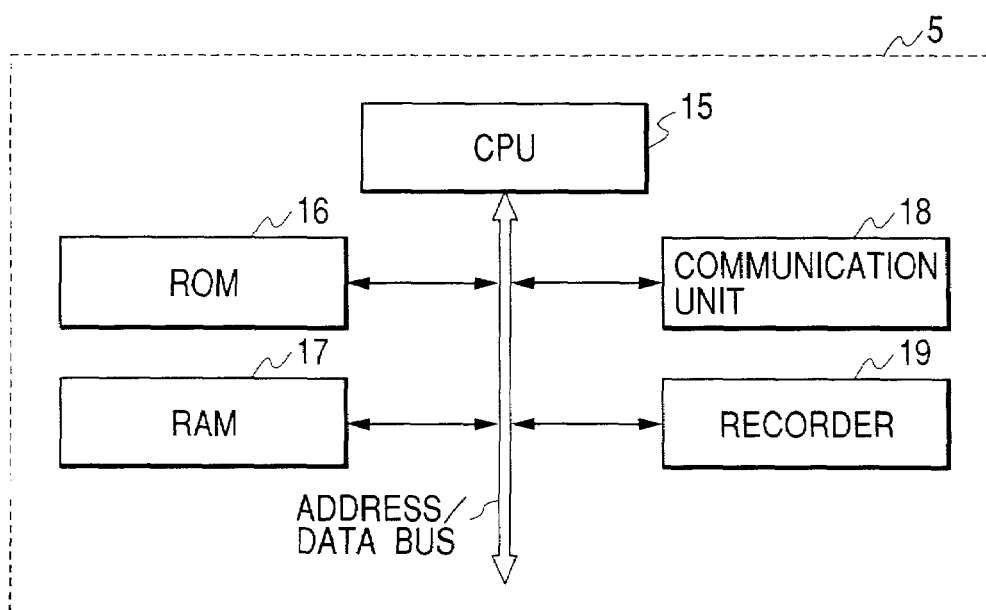
FIG. 3 is a block diagram showing a construction of hardware in a printer 5.

FIG. 3 is a block diagram showing a construction of hardware in the printer 5. In the diagram, reference numeral 15 denotes a CPU comprising a microprocessor or the like. The CPU 15 functions as a central processing unit of the printer 5 and controls an RAM 17, a communication unit 18, and a recorder 19 in accordance with a program stored in an ROM 16.

A program for allowing the printer 5 to execute a recording (printing) process in accordance with a control of a printer driver 20 (which will be explained hereinlater in FIG. 4) has been stored in the ROM 16. Print data which is mainly sent from the hand-held PC 1 and printed by the recorder 19 is temporarily stored in the RAM 17.

The communication unit 18 includes the USB port 7 and controls communication of the USB. The recorder 19 comprises: a recording unit constructed by a recording head of the ink-jet system, each color ink, a carriage, a recording paper conveying mechanism, and the like; and an electric circuit constructed by an ASIC for generating print pulses by the recording head on the basis of the print data, and the like.

Display contents (image data) of a file opened by the application are converted into the print data including a printer control command through the printer driver by the printing operation on a printable application (which will be explained hereinlater in FIG. 6). After that, the print data is temporarily stored into a data memory area in the RAM 11 of the hand-held PC 1 and sent from the USB port 4 to the printer 5 via the USB interface.

The print data received by the printer 5 is converted into print pulses by the recorder 19 and printed onto a recording paper.

Figure 4:
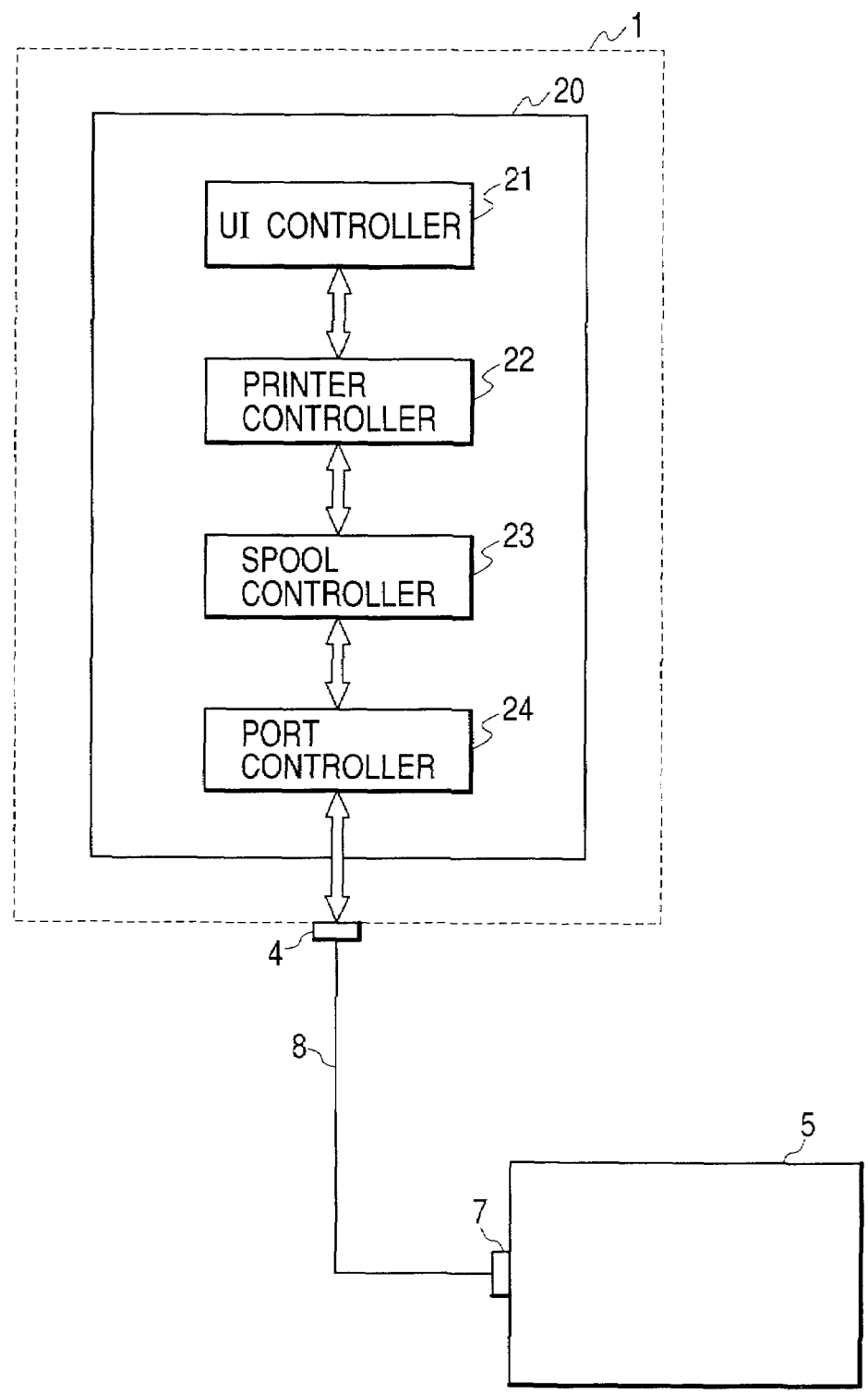
FIG. 4 is a block diagram showing a functional construction of a printer driver 20 for controlling the printer 5.

FIG. 4 is a block diagram showing a functional construction of the printer driver 20 for controlling the printer 5. The printer driver 20 has been stored in the ROM 10 of the hand-held PC 1. In the diagram, each arrow indicates a flow of the data.

Reference numeral 21 denotes a UI controller for controlling a UI of the printer driver 20. Reference numeral 22 denotes a printer controller for controlling the printer 5 by sending a control command to the printer 5 in response to an instruction from the UI controller 21 or notifying the UI controller of a state of the printer 5 on the basis of a response command from the printer 5.

Reference numeral 23 denotes a spool controller. When the print data is printed from the application, if there is a sufficient available area in the RAM 11 of the hand-held PC 1, the spool controller 23 converts the image data sent from the application into the print data, thereafter, temporarily stores the print data as a spool file into the RAM 11, releases the printing process in the application at the point when the whole print data is stored and the spool file is completed, and sends the print data in the spool file to the printer 5 by a background. The operation such that the whole print data is temporarily stored as a spool file into the RAM 11 of the hand-held PC 1, the print data in the spool file is sent to the printer 5 by the background, and the printing process is executed as mentioned above is called a spool print. During the spool print, an arbitrary operation can be executed on the application.

On the other hand, if a sufficient available area does not exist in the RAM 11 of the hand-held PC 1, the whole print data is not temporarily stored as a spool file but the image data of a raster unit sent from the application is converted into the print data, the print data is sequentially sent to the printer 5 by a foreground, and the printing process is executed. The operation such that the print data is sequentially sent to the printer 5 and the printing process is executed as mentioned above is called a direct print. During the direct print, the operation cannot be executed on the application.

Reference numeral 24 denotes a port controller for writing the print data sent from the spool controller 23 to the communication unit 12, reading the response command from the printer 5 from the communication unit 12, or making a control of the port which is mainly seen from the printer driver level.

Figure 5:
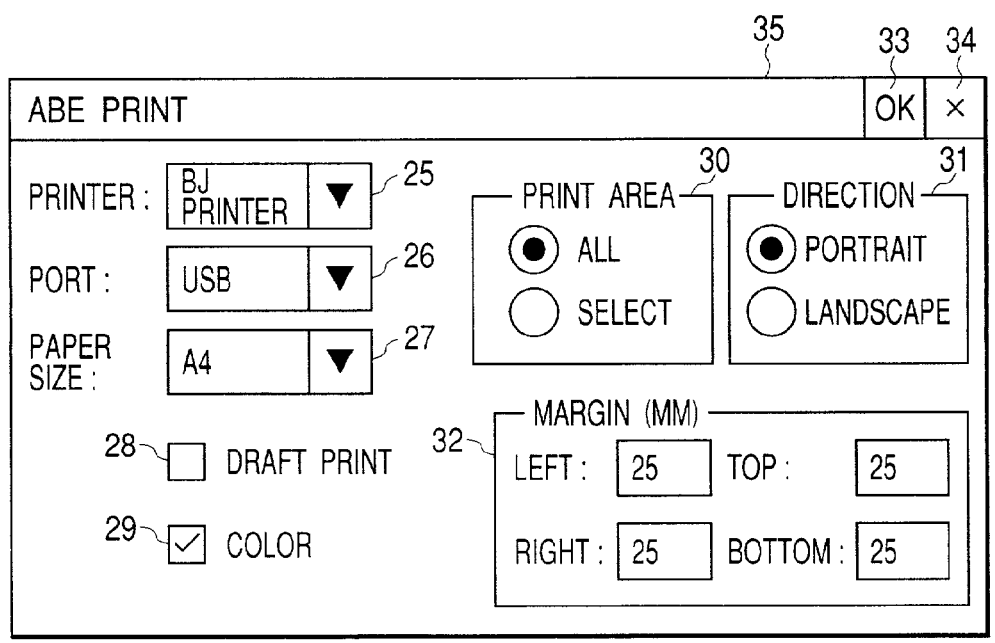
FIG. 5 is a diagram showing an example of a UI of the printer driver 20.

FIG. 5 is a diagram showing an example of the UI of the printer driver 20. When the printer driver 20 is activated, the UI is displayed on the LCD 2 of the hand-held PC 1. In the diagram, reference numeral 35 denotes a main window.

Reference numeral 25 denotes a printer selector constructed by a combo box. By selecting the connected printer, the print can be executed by this printer. In the diagram, a "BJ printer" is selected.

Reference numeral 26 denotes a port selector constructed by a combo box. The port selector 26 can select a printable port equipped for the hand-held PC 1. In the diagram, the USB port has been selected.

Reference numeral 27 denotes a paper size selector constructed by a combo box. The paper size selector 27 can select one of the three types of A6, A5, and A4 as a paper size. In the diagram, the A4 size has been selected.

Reference numeral 28 denotes a draft print selector constructed by a check box. When this check box is marked, print quality is reduced and the printing process is executed at quality of a draft print. When this check box is not marked, the printing process is executed at standard quality. In the diagram, the draft print selector 28 is in a state where it is not marked.

Reference numeral 29 denotes a color print selector constructed by a check box. When this check box is marked, a color print is executed. When this check box is not marked, a monochromatic print is executed. In the diagram, the color print selector is in a state where it has been marked.

Reference numeral 30 denotes a print area selector constructed by a radio button. When "ALL" is selected, the whole area is printed irrespective of the area selected on the display of the application. If "SELECT" is selected, a region in the area selected on the display of the application is printed. In the diagram, the print area selector 30 is in a state where "ALL" has been selected.

Reference numeral 31 denotes a print direction selector constructed by a radio button. When "PORTRAIT" is selected, the display of the application is developed in the vertical direction and the print is performed. When "LANDSCAPE" is selected, the display of the application is developed in the lateral direction and the print is performed. In the diagram, the direction selector 31 is in a state where "PORTRAIT" has been selected.

Reference numeral 32 denotes a margin setter constructed by a text box by which a numerical value can be inputted. Margins on the upper, lower, right, and left sides of the paper can be set on a millimeter unit basis, respectively. In the diagram, the margin setter 32 is in a state where all of the margins of the upper, lower, right, and left sides have been set to 25 mm.

Reference numeral 33 denotes an OK button. When the OK button 33 is tapped, the print is started. Reference numeral 34 denotes a cancel button. When the cancel button 34 is tapped, the main window 35 is closed without printing.

A combination of the settings in the printer selector 25, port selector 26, paper size selector 27, draft print selector 28, color print selector 29, print area selector 30, print direction selector 31, margin setter 32 is called a "print setting" hereinafter.

Figure 6:
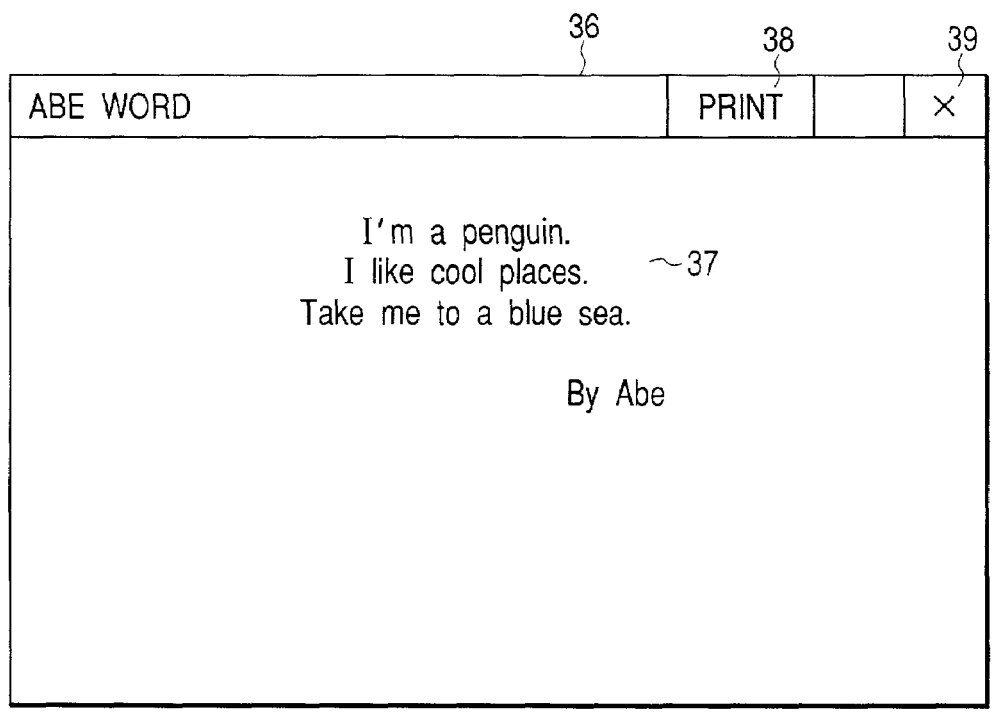
FIG. 6 is a diagram showing an example of a UI of a printable application.

FIG. 6 is a diagram showing an example of a UI of a printable application. This application is an application of a word processor. In the diagram, reference numeral 36 denotes a main window and a state where a character string 37 has been inputted is shown.

Reference numeral 38 denotes a print button for starting the print. By tapping the print button 38, the printer driver 20 is activated and the main window 35 shown in FIG. 5 is displayed. By tapping the OK button 33 in the main window 35, the print of the displayed character string 37 is started.

Reference numeral 39 denotes a close button for closing the present application. By tapping the close button 39, the main window 36 is closed and the present application is closed.

Figure 7:
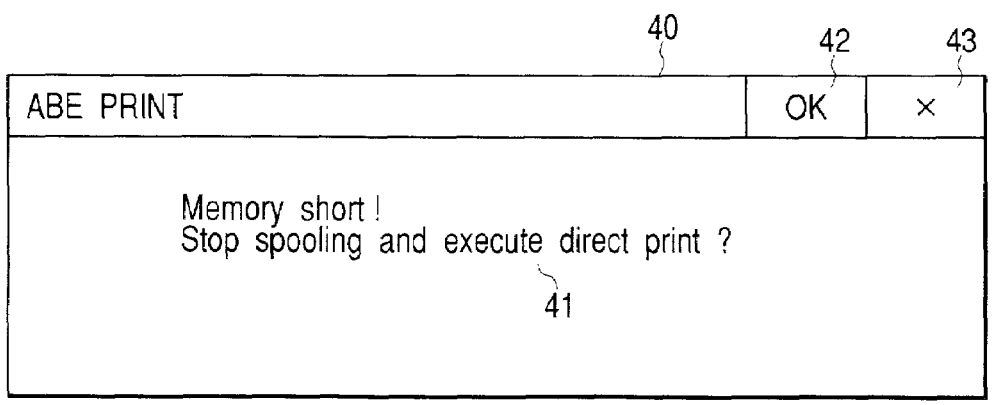
FIG. 7 is a diagram showing a message indicative of a shortage of an available memory.

FIG. 7 is a diagram showing a message indicative of a shortage of an available memory in the case where the memory (RAM 11) for performing the spool print cannot be reserved. In the diagram, reference numeral 40 denotes an available memory shortage message comprising a message character string 41, an OK button 42, and a cancel button 43. This message is displayed in the case where the capacity of the available memory (RAM 11) of the hand-held PC 1 is lacking and the memory (RAM 11) for performing the spool print cannot be reserved.

When the OK button 42 is tapped, the spool print is not performed but the direct print is started. When the cancel button 43 is tapped, the print is stopped. When the cancel button 43 is tapped and the print is stopped, the capacity of the available memory (RAM 11) for performing the spool print is sufficiently increased by a method of deleting the unnecessary files or the like after that. Subsequently, by tapping the print button 38 and retrying the print, the spool print can be performed. In the embodiment, the OK button 42 and cancel button 43 correspond to a continuity selector and a stop selector in the invention.

According to the embodiment as mentioned above, by displaying the available memory shortage message 40, the user can easily select either a mode to continue the printing process or a mode to stop, thereby enabling the user to, for example, retry the spool print or the like. If the capacity of the available memory (RAM 11) is lacking, by automatically switching the printing mode to the direct print without displaying the available memory shortage message 40, the operation for allowing the user to respond to the available memory shortage message 40 is unnecessary. The operability for the user regarding the printing operation can be improved.

In the printable application, which one of those modes is selected depends on a use object of the application and is not concerned with the essence of the invention.

Figure 8:
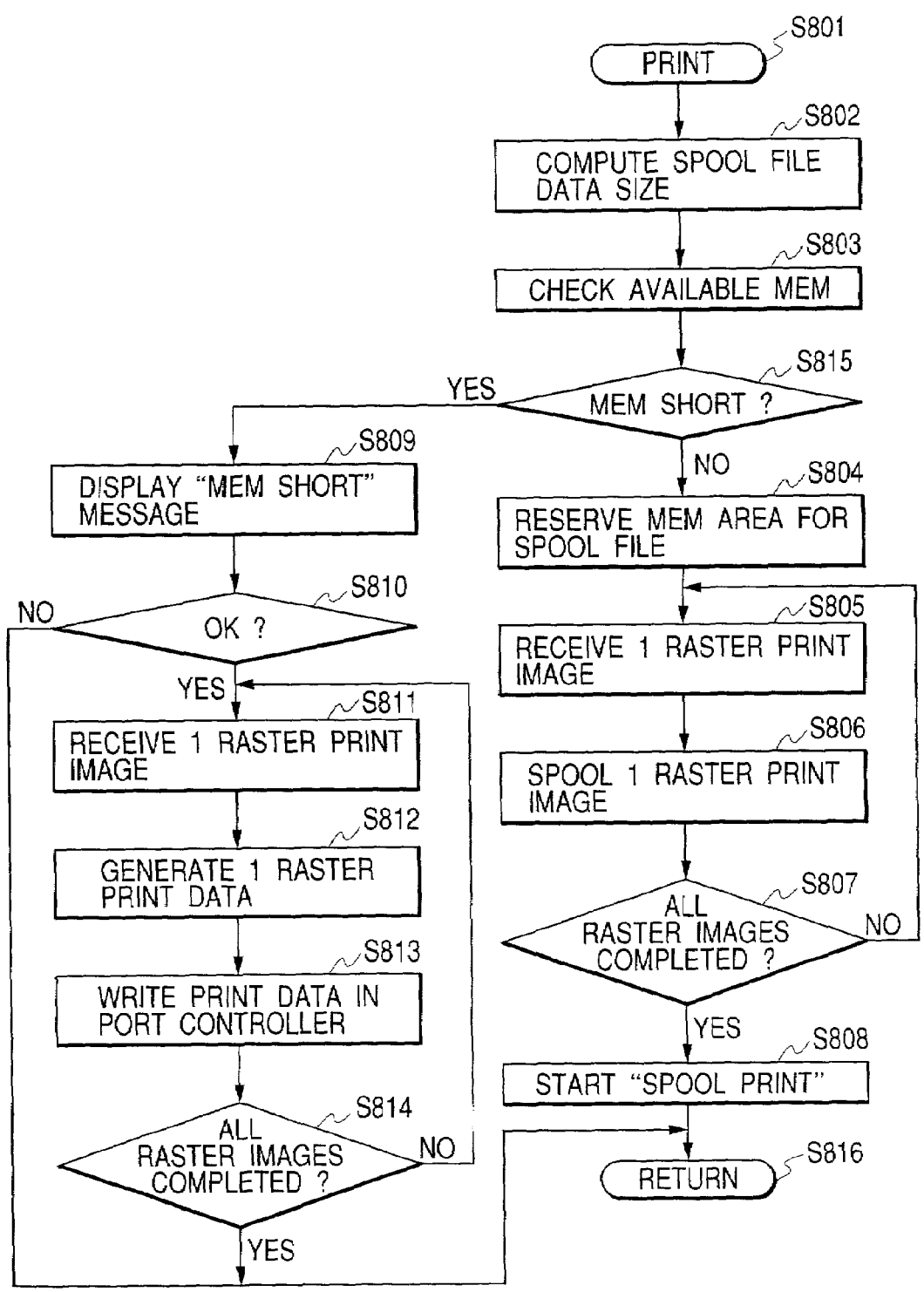
FIG. 8 is a flowchart showing processes after a printing process is started.

FIGS. 8 and 9 are flowcharts showing the operation (processes) in the print system of the embodiment and the operation will be described hereinbelow with reference to those flowcharts. FIG. 8 is the flowchart showing the processes which are executed after the OK button 33 in the main window 35 of the printer driver 20 was tapped and the printing process was started. When the OK button 33 in the main window 35 of the printer driver 20 is tapped and the printing process is started (step S801), a data size of spool file which is temporarily stored in the memory (RAM 11) of the hand-held PC 1 at the time of the spool print is calculated (step S802). Whether the available capacity of the data memory area of the memory (RAM 11) is larger than the data size of the spool file or not is discriminated (step S803).

If the available capacity of the memory (RAM 11) is sufficient (step S815), the area for the spool file is reserved from the available area in the memory (RAM 11) (step S804). The print image data of one raster of the print target is received from the application (step S805). The print control command is added to the print image data and the image data is converted into the print data and, thereafter, the print data is stored into the spool file (step S806).

If the print image data of all of the rasters of the print target were sent from the application and the spooling process is completed (the spool file is completed) (step S807), the spool print is started (step S808). The processing routine is returned to the application (step S816). If the spooling process of the print image data of all of the rasters is not completed in step S807, the processing routine is returned to step S805.

If the available capacity of the memory (RAM 11) is lacking (step S815), the available memory shortage message 40 is displayed (step S809). When the OK button 42 is tapped (step S810), the direct print is started. The print image data of one raster of the print target is received from the application (step S811). The print control command is added to the print image data and the image data is converted into the print data (step S812). By writing the print data of one raster into the port controller 24, the print data is sent to the printer 5 (step S813). When the print image data of all of the rasters of the print target is sent from the application and the transmission of all of the print data is completed (step S814), the processing routine is returned to the application (step S816). If the transmission of all of the print data is not completed in step S814, the processing routine is returned to step S811. The processes which are executed for a period of time until the end of steps S811 to S814 show the processes of the direct print.

If the cancel button 43 is tapped in step S810, the printing process is stopped and the processing routine is returned to the application (step S816).

As a modification, if the available capacity of the memory (RAM 11) is lacking in step S815, by skipping steps S809 and S810 and advancing to step S811, as described in FIG. 7, the process is automatically switched to the direct print without displaying the available memory shortage message 40. Thus, the operation for allowing the user to respond to the available memory shortage message 40 is unnecessary. The operability for the user regarding the printing operation can be improved.

In the above operation, when the processing routine is returned to the application in step S816, the application closes the main window 35 of the printer driver 20 and releases the printer driver 20. Although the printer driver 20 cannot execute the operation on the application during the activation, when the printer driver 20 is released, it can execute an arbitrary operation on the application.

FIG. 9 is the flowchart showing the processes of the spool print. When the spool print is started in step S808 in FIG. 8 (step S901), the print data is loaded from the spool file and written into the port controller 24, so that the print data is sent to the printer 5 (step S903). After that, the written print data is deleted from the spool file and the memory (RAM 11) of the capacity corresponding to the deleted data is released (step S904).

When the transmission of all of the print data is completed (step S905), the spool print is finished (step S906). If the transmission of all of the print data is not completed in step S905, the processing routine is returned to step S902.

The operation in each state of the embodiment has been described above. As mentioned above, since the hand-held PC 1 does not have the storage device of a large capacity such as a hard disk drive and has only the RAM 11 as memory means, an amount of data which can be stored in the data memory area in the memory (RAM 11) is limited in accordance with the use situation of the user. Particularly, like a spooling printing process, when it is necessary to store the spool file of a relatively large data size into the memory (RAM 11), a case where the spool file cannot be formed and the print cannot be normally executed occurs.

Paying attention to such a problem, in the hand-held PC 1, also in the case where it is necessary to store the spool file of the relatively large data size into the memory (RAM 11) like a spool printing process, if the spool file cannot be formed, by switching the process to the direct print in which it is unnecessary to form the spool file, the print can be normally completed in all of the cases.

Upon direct print, since it is sufficient to reserve the dedicated memory (RAM 11) in the available area, the invention can be easily realized. If the spool file can be formed, since the spool print is executed, the print job can be more rapidly released from the application. In a state where the print job is being run in the background, an arbitrary operation can be executed on the application.

There is also a method of designing by attaching importance either to the mode for improving the operability for the application by giving a priority to the spool print or the mode for improving the operability for the user regarding the printing operation by selecting either the mode in which the available memory shortage message 40 is displayed or the mode in which it is not displayed in accordance with the use object of the application. In case of displaying the available memory shortage message 40, the user can easily grasp the state of the available area in the memory (RAM 11) of the hand-held PC 1.

Although the color printer 5 has been mentioned as an example of the peripheral equipment in the embodiment, the invention is not limited to it. The invention is effective in all of peripheral equipment having a spool concept similar to that mentioned above. Although the example of the color printer of the ink-jet system has been mentioned in the embodiment, the invention is not limited to it but, naturally, the invention is also effective in a laser beam printer or a monochromatic printer.

In the embodiment, as data to be written into the spool file, the invention can be easily realized by using the print data in which the printer 5 can be directly controlled. However, the invention is not limited to such an example. A similar effect is obtained also by a method whereby intermediate data which is necessary for an intermediate process between the print image data that is sent from the application and the print data is written into the spool file. In this case, further, a size of spool file can be reduced.

In the embodiment, although the Japanese word processor has been used as an example of the printable application, the invention is not limited to such an example. It can be also realized by an arbitrary printable application.

Although the Microsoft Windows CE has been used in the embodiment above, the invention is not limited to such an OS, but by using a construction similar to that mentioned above, the invention can be also realized by an arbitrary OS.

In the embodiment, although the USB (Universal Serial Bus) interface has been used as an interface which connects the hand-held PC 1 and the printer 5, the invention is not limited to such an interface. By using a similar construction as mentioned above, it can be realized by an arbitrary interface.

(Other Modifications)

The invention incorporates a case where in order to make various devices operative so as to realize the functions of the foregoing embodiment, program codes of software to realize the functions of the embodiment mentioned above are supplied to a computer in an apparatus or a system connected to the above various devices and these devices are made operative in accordance with a program stored in the computer (a CPU or an MPU) of the system or apparatus, thereby embodying the invention.

In such a case, the program codes themselves of the software realize the functions of the embodiment mentioned above. The program codes themselves and means for supplying the program codes to a computer, for example, a recording medium in which the program codes have been stored construct the invention. As a recording medium for storing the program codes, for example, it is possible to use a floppy disk, a hard disk, an optical disk, a magnetooptic disk, a CD-ROM, a magnetic tape, a non-volatile memory card, an ROM, or the like can be used.

In not only a case where a computer executes the supplied program codes, so that the functions of the embodiment mentioned above are realized, but also a case where the program codes cooperate with an OS (Operating System) which is operating on the computer, another application software, or the like, so that the functions of the embodiment mentioned above are realized, such program codes are naturally incorporated in the scope of the embodiment of the invention.

Further, the invention also incorporates a case where the supplied program codes are stored into a memory equipped for a function expanding board of a computer or a function expanding unit connected to a computer and, thereafter, a CPU or the like equipped for the function expanding board or the function expanding unit executes a part or all of the actual processes on the basis of instructions of the program codes, and the functions of the embodiment mentioned above are realized by those processes.

The shape and structure of each unit shown in the embodiment are examples in case of embodying the invention, and the technical scope of the invention should not be limitatively interpreted by them. That is, many modifications and variations of the invention are possible without departing from the spirit or main features of the invention.

As described above, according to the invention, the operability for the user regarding the printing operation can be improved and the print can be normally completed in all of the cases.

Further, since it is sufficient to reserve a memory area necessary for the printing process within the available area of the memory means such as a memory or the like, the invention can be easily realized.

Moreover, the printing process can be more rapidly released from the application and, in a state where the print job is run in the background, an arbitrary operation can be executed on the application.

In addition, the invention can be easily realized and, in the latter case, the size of spool file can be reduced.

Furthermore, the user can easily grasp the state of the available area.

Further, the user can easily select whether the printing process is continued or stopped.

What is claimed is:

1. An information processing apparatus which serves as a host computer and can communicate with a printing apparatus, comprising:
   a spool unit, adapted to spool data;
   a generation unit, adapted to generate, through a printer driver, print data based on drawing data received from an application;
   an area confirmation unit, adapted to confirm a size of an available memory area in said spool unit;
   a comparison unit, adapted to compare a size of the print data generated by said generation unit and the size of the available area confirmed by said area confirmation unit; and
   a determination unit, adapted to determine that spool print processing is to be executed, if a comparison result by said comparison unit shows that the size of the print data is smaller than the size of the available memory area, wherein in the spool print processing, the generated print data is spooled in said spool unit and then transmitted to the printing apparatus, and to determine that direct print processing is to be executed, if a comparison result by said comparison unit shows that the size of the print data is larger than the size of the available memory area, wherein in the direct print processing, the generated print data is transmitted to the printing apparatus without being spooled in said spool unit.

2. An information processing apparatus according to claim 1, wherein in the direct print mode processing, the generated print data is transmitted to the printing apparatus, and thereafter, a next part of the generated print data is transmitted to the printing apparatus, and such processing is repeated.

3. An information processing apparatus according to claim 1, wherein the print data is constructed by a print command which can directly control the printing apparatus or an intermediate print command which can form the print command by decoding the command.

4. An information processing apparatus according to claim 1, further comprising a message display unit adapted to display a message indicative of shortage of the available memory area onto a display apparatus, if a comparison result by said comparison unit shows that the size of the print data is larger than the size of the available memory area.

5. An information processing apparatus according to claim 4, further comprising a selector display unit adapted to display a continuation selector for continuing a printing process and a stop selector for stopping the printing process onto the display apparatus together with the message,
   wherein, when the continuation selector is selected, the direct print processing is executed, and, when the stop selector is selected, the printing process is stopped.

6. An information processing apparatus according to claim 1, wherein said information processing apparatus is a hand-held personal computer.

7. A computer-executable program stored on a computer-readable medium for execution by an information processing apparatus which serves as a host computer and can communicate with a printing apparatus, the computer-executable program comprising:
   a spool module, adapted to spool data;
   a generation module, adapted to generate, through a printer driver, print data based on drawing data received from an application;
   an area confirmation module, adapted to confirm a size of an available memory area in said spool module;
   a comparison module, adapted to compare a size of the print data generated by said generation module and the size of the available area confirmed by said area confirmation module; and
   a determination module, adapted to determine that spool print processing is to be executed, if a comparison result by said comparison module shows that the size of the print data is smaller than the size of the available memory area, wherein in the spool print processing, the generated print data is spooled in said spool module and then transmitted to the printing apparatus, and to determine that direct print processing is to be executed, if a comparison result by said comparison module shows that the size of the print data is larger than the size of the available memory area, wherein in the direct print processing, the generated print data is transmitted to the printing apparatus without being spooled in said spool module.

8. A computer-executable program according to claim 7, wherein in the direct print mode processing, the generated print data is transmitted to the printing apparatus, and thereafter, a next part of the generated print data is transmitted to the printing apparatus, and such processing is repeated.

9. A computer-executable program according to claim 7, wherein the print data is constructed by a print command which can directly control the printing apparatus or an intermediate print command which can form the print command by decoding the command.

10. A computer-executable program according to claim 7, further comprising a message display module adapted to display a message indicative of shortage of the available memory area onto a display apparatus, if a comparison result by said comparison module shows that the size of the print data is larger than the size of the available memory area.

11. A computer-executable program according to claim 10, further comprising a selector display module adapted to display a continuation selector for continuing a printing process and a stop selector for stopping the printing process onto the display apparatus together with the message, wherein, when the continuation selector is selected, the direct print processing is executed, and, when the stop selector is selected, said the printing process is stopped.

12. A computer-executable program according to claim 7, wherein the information processing apparatus is a hand-held personal computer.

13. An information processing method comprising:
a spooling step of spooling data;
a generation step of generating, through a printer driver, print data based on drawing data received from an application;
an area confirmation step of confirming a size of an available memory area in said spooling step;
a comparison step of comparing a size of the print data generated in said generation step and the size of the available area confirmed in said area confirmation step; and
a determination step of determining that spool print processing is to be executed, if a comparison result in said comparison step shows that the size of the print data is smaller than the size of the available memory area, wherein in the spool print processing, the generated print data is spooled in said spooling step and then transmitted to the printing apparatus, and to determine that that direct print processing is to be executed, if a comparison result in said comparison step shows that the size of the print data is larger than the size of the available memory area, wherein in the direct print processing, the generated print data is transmitted to the printing apparatus without being spooled in said spooling step.

14. A print system having an information processing apparatus which serves as a host computer in communication with a printing apparatus, the information processing apparatus comprising:
a spool unit, adapted to spool data;
a generation unit, adapted to generate, through a printer driver, print data based on drawing data received from an application;
an area confirmation unit, adapted to confirm a size of an available memory area in said spool unit;
a comparison unit, adapted to compare a size of the print data generated by said generation unit and the size of the available area confirmed by said area confirmation unit; and
a determination unit, adapted to determine that spool print processing is to be executed, if a comparison result by said comparison unit shows that the size of the print data is smaller than the size of the available memory area, wherein in the spool print processing, the generated print data is spooled in said spool unit and then transmitted to the printing apparatus, and to determine that direct print processing is to be executed, if a comparison result by said comparison unit shows that the size of the print data is larger than the size of the available memory area, wherein in the direct print processing, the generated print data is transmitted to the printing apparatus without being spooled in said spool unit.

* * * * *

UNITED STATES PATENT AND TRADEMARK OFFICE
CERTIFICATE OF CORRECTION

| | | |
|---|---|---|
| PATENT NO. | : 7,084,999 B2 | Page 1 of 1 |
| APPLICATION NO. | : 10/013862 | |
| DATED | : August 1, 2006 | |
| INVENTOR(S) | : Koichi Abe | |

It is certified that error appears in the above-identified patent and that said Letters Patent is hereby corrected as shown below:

<u>COLUMN 11</u>:
Line 22, "said the" should read -- the --.

Signed and Sealed this

Twenty-seventh Day of March, 2007

JON W. DUDAS
*Director of the United States Patent and Trademark Office*